(12) United States Patent
Herz et al.

(10) Patent No.: US 9,122,643 B2
(45) Date of Patent: Sep. 1, 2015

(54) EVENT TRIGGER BASED DATA BACKUP SERVICES

(75) Inventors: William Samuel Herz, Hayward, CA (US); Andrew C. Fear, Campbell, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 512 days.

(21) Appl. No.: 11/297,985

(22) Filed: Dec. 8, 2005

(65) Prior Publication Data

US 2007/0136541 A1 Jun. 14, 2007

(51) Int. Cl.
*G06F 11/14* (2006.01)

(52) U.S. Cl.
CPC ........ *G06F 11/1466* (2013.01); *G06F 11/1464* (2013.01); *G06F 11/1458* (2013.01); *G06F 11/1461* (2013.01)

(58) Field of Classification Search
USPC ............................................ 711/162; 714/13
See application file for complete search history.

(56) References Cited

U.S. PATENT DOCUMENTS

| | | | |
|---|---|---|---|
| 5,500,940 A | 3/1996 | Skeie | |
| 5,560,023 A * | 9/1996 | Crump et al. | 713/323 |
| 5,751,997 A * | 5/1998 | Kullick et al. | 711/162 |
| 5,828,823 A | 10/1998 | Byers et al. | |
| 6,038,665 A * | 3/2000 | Bolt et al. | 713/176 |
| 6,226,759 B1 | 5/2001 | Miller et al. | |
| 6,574,754 B1 * | 6/2003 | Smith | 714/47 |
| 6,598,173 B1 | 7/2003 | Sheikh et al. | |
| 6,789,114 B1 | 9/2004 | Garg et al. | |
| 6,970,183 B1 | 11/2005 | Monroe | |
| 7,076,803 B2 | 7/2006 | Bruton, III et al. | |
| 7,138,946 B2 | 11/2006 | Tamaki et al. | |
| 7,139,846 B1 * | 11/2006 | Rossi | 710/6 |
| 7,165,154 B2 | 1/2007 | Coombs et al. | |
| 7,222,233 B1 * | 5/2007 | Rubin | 713/168 |
| 7,281,100 B2 * | 10/2007 | Richard et al. | 711/162 |
| 7,330,997 B1 | 2/2008 | Odom | |
| 7,363,528 B2 | 4/2008 | Chan et al. | |
| 8,402,322 B2 | 3/2013 | Herz et al. | |
| 2002/0038188 A1 | 3/2002 | Fioravanti | |
| 2003/0088792 A1 | 5/2003 | Card et al. | |

(Continued)

FOREIGN PATENT DOCUMENTS

| | | |
|---|---|---|
| JP | 11242636 | 9/1999 |
| JP | 2001092688 | 4/2001 |

(Continued)

OTHER PUBLICATIONS

Breed, Julia; et al., "The Spacecraft Emergency Response System (SERS) for Autonomous Mission Operations". Report from NASA center; Goddard Space Flight Center, Publication Year: 1998. [Retrieved on Aug. 29, 2007]. Retrieved from Internet: <URL:http://isd.gsfc.nasa.gov/Papers/DOC/SERS_Taiwan.pdf>.

(Continued)

*Primary Examiner* — Sherief Badawi
*Assistant Examiner* — Christopher J Raab

(57) ABSTRACT

Methods and systems of initiating a backup process of data stored on a computer are described. One method calls for the data to be backed up to be identified. A backup event trigger is defined, and the computer is monitored for the occurrence of the backup event trigger. If the trigger occurs, a balancing heuristic is applied, to determine whether to initiate the backup process.

20 Claims, 6 Drawing Sheets

(56) References Cited

U.S. PATENT DOCUMENTS

| | | | |
|---|---|---|---|
| 2003/0145226 A1* | 7/2003 | Bruton et al. | 713/201 |
| 2004/0088589 A1 | 5/2004 | Westerinen et al. | |
| 2004/0205403 A1 | 10/2004 | Markow et al. | |
| 2004/0260873 A1* | 12/2004 | Watanabe | 711/114 |
| 2004/0260973 A1* | 12/2004 | Michelman | 714/13 |
| 2004/0262409 A1 | 12/2004 | Crippen et al. | |
| 2005/0110637 A1* | 5/2005 | Rao | 340/541 |
| 2005/0216788 A1* | 9/2005 | Mani-Meitav et al. | 714/6 |
| 2005/0257085 A1* | 11/2005 | Haustein et al. | 714/13 |
| 2006/0031476 A1 | 2/2006 | Mathes et al. | |
| 2006/0051157 A1* | 3/2006 | Bornstein et al. | 401/206 |
| 2006/0069928 A1 | 3/2006 | Winick et al. | |
| 2006/0075293 A1 | 4/2006 | Bodlaender | |
| 2006/0168471 A1 | 7/2006 | Schulstad | |
| 2006/0206544 A1* | 9/2006 | Oks et al. | 707/204 |
| 2006/0212755 A1 | 9/2006 | Urmanov et al. | |
| 2006/0259815 A1 | 11/2006 | Graham et al. | |
| 2006/0277433 A1 | 12/2006 | Largman et al. | |
| 2007/0067587 A1* | 3/2007 | Rossi | 711/162 |
| 2007/0075293 A1 | 4/2007 | Tahon et al. | |
| 2008/0134330 A1 | 6/2008 | Kapoor et al. | |

FOREIGN PATENT DOCUMENTS

| | | |
|---|---|---|
| JP | 2002259063 | 9/2002 |
| JP | 2003240054 | 8/2003 |
| JP | 2003242045 | 8/2003 |
| JP | 2003345627 | 12/2003 |
| JP | 2005157992 | 6/2005 |
| JP | 2005189969 | 7/2005 |

OTHER PUBLICATIONS

Final Office Action dated Jan. 8, 2009; U.S. Appl. No. 11/298,173.
Non Final Office Action dated Jul. 11, 2008; U.S. Appl. No. 11/298,173.

* cited by examiner

Flowchart 300

EVENT TRIGGER BASED DATA BACKUP SERVICES

BACKGROUND

1. Field of the Invention

Embodiments of the present invention relate to the preservation of digital information generally, and more specifically to automated backup of digital information.

2. Related Art

One of the conveniences of digital data is its ease of manipulation. Files in a computer system can be edited, moved, copied, and deleted quickly and easily. Unfortunately, digital data is also very easy to lose. One mistyped command, or a virus-infected file, or a hard drive failure is enough to wipe out thousands of files, each of which may be valuable.

At least three factors influence the value of electronically stored data. If the data required large amounts of time to enter into a computer, the loss of that data means that more time will have to be spent to recreate it. For example, a business may have a database where all of their vendor information is stored. If the hard drive containing the database crashes, even if it is possible to recreate that database, it would require significant time to do so.

Some files have an associated monetary cost. For example, some software companies allow you to purchase software for download over the Internet. If those files are destroyed by a virus, and must be repurchased, the loss of those files represents the loss of the money used to purchase them.

Other files are truly unique, and the loss of those files may be the most costly. A digital picture of an historic event, or email records of years of business communication, cannot be recreated and cannot be repurchased. No amount of time or money can restore unique data, once it is lost.

One solution to the problem of the preservation of digital information is to store that information in another location, a process frequently described as "backing up" the data, or creating a backup. Uniformly, however, the backup process is inconvenient. In some cases, a backup is created by manually copying files to an alternate location, such as a stack of floppy disks or a second hard drive, a process which requires time. In other cases, automated backup software is used to create backups. Such software can, at best, be set to trigger at a particular time, which can be inconvenient for someone trying to use the computer at that given time. Additionally, these automated backup processes are slow to act. Often, several minutes pass while the software is examining the computer system, before any data is backed up.

Prior art backup systems are all preventative; in order to have any value at all, they must be utilized before any actual crisis situation occurs. Such systems cannot react to a situation by immediately backing up crucial data. Nor can existing systems determine whether there is a need to backup crucial data.

SUMMARY

Methods and symptoms for initiating a backup process are described. In one embodiment, backup event triggers are defined, and a computer is monitored to detect occurrences of these triggers. If a trigger is detected, a balancing heuristic is applied to determine if a backup process should be initiated or not. In this embodiment, automated initialization of the backup process is not limited to a simple time trigger, as is known in the prior art. For instance, system monitoring software can be applied to monitor system events that potentially predict system failure, e.g., predict that a hard drive is failing, that detect if the system is approaching a thermal limit, and/or determine when a manual backup is done. Further, by applying a balancing test, the inconvenience for a user trying to use the computer is reduced, as a backup process is less likely to begin while the computer is in use.

In another embodiment, data to be backed up is identified before the backup process is initiated. The computer is monitored for a backup event trigger, and upon detection, the backup process is initiated. By locating the data to be preserved before the backup process begins, the prior art problem of slow backup processes is greatly reduced.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
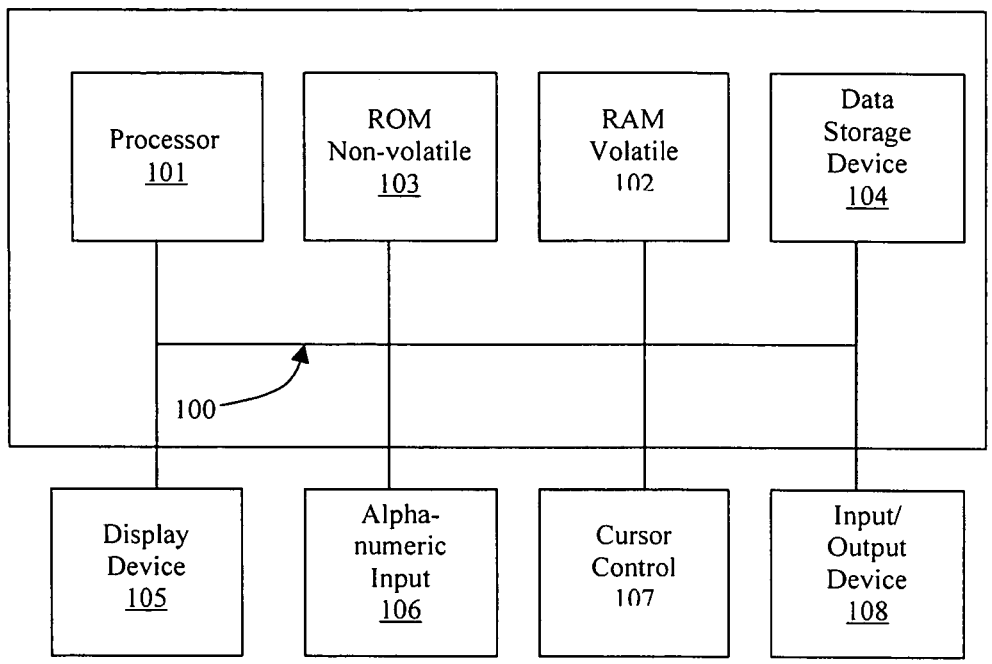
FIG. 1 is a block diagram of an exemplary computer system upon which embodiments of the present invention may be implemented.

Methods and systems for providing data backup services are described. Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Notation and Nomenclature

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIGS. 3, 5, and 6) describing the operations of this method, such steps and sequencing are exemplary. Embodiments of the present invention are well suited to performing various other steps or variations of the steps recited in the flowchart of the figure herein, and in a sequence other than that depicted and described herein.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System and Network

Referring now to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1. In several embodiments, for example, a media server or a personal video recorder (PVR) is utilized, in place of system 112. In another embodiment, system 112 is connected to a network attached storage device (NAT). Moreover, the present invention may be practiced on any system which can be configured to allow it, not just computer systems like computer system 112.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet or an intranet (e.g., a local area network).

It is understood that embodiments of the present invention can be practiced on many different types of computer system 112. Examples include, but are not limited to, desktop computers, workstations, servers, media servers, laptops, gaming consoles, and personal digital assistants (PDAs), as well as other electronic devices with computing and data storage capabilities, such as wireless telephones, media center computer, digital video recorders, digital cameras, and digital audio playback or recording devices.

Figure 2:
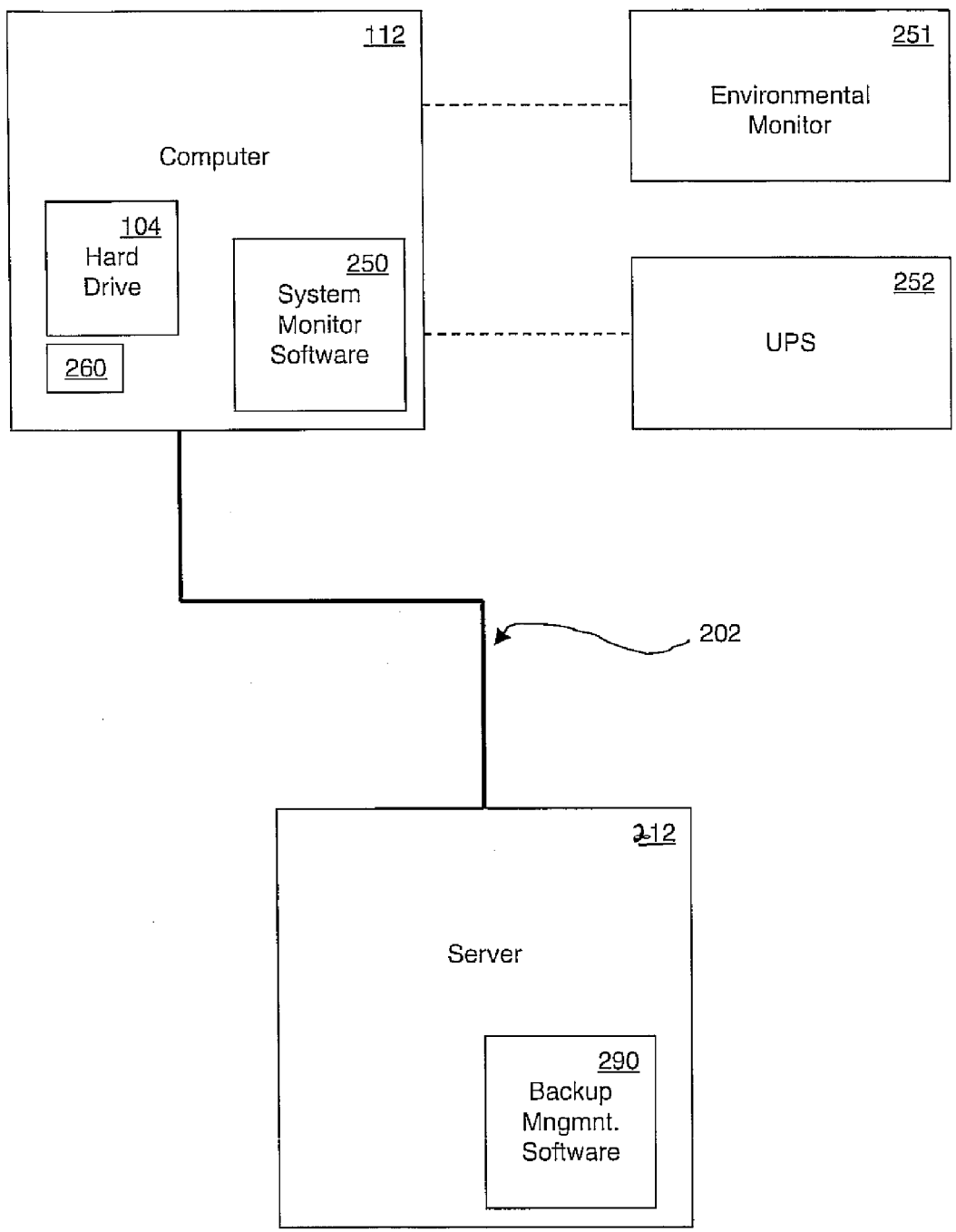
FIG. 2 is a block diagram of an exemplary computer network upon which embodiments of the present invention may be implemented.

With reference now to FIG. 2, a block diagram of an exemplary computer network is depicted, upon which embodiments of the present invention may be implemented. Computer system 112 is shown communicating with server 212 over network connection 202. Network connection 202 can be any means of allowing data transfer between system 112 and server 212. In one embodiment, network connection 202 is a local area network (LAN). In such an embodiment, system 112 and server 212 can be located near to each other, such as within the same office. In another embodiment, network connection 202 is the Internet, and server 212 need not be located physically near to system 112. In another embodiment, network connection 202 is a wireless connection. In another embodiment, network connection 202 is a direct connection, e.g., a universal serial bus (USB) connection. Other embodiments allow for other methods of communication between system 112 and server 212. Other embodiments allow for indirect communication as well, e.g., system 112 is behind a firewall. In some embodiments, multiple systems 112 may connect to a single server 212. In some embodiments, a single system 112 can connect to multiple servers 212. In a further series of embodiments, a single computer system can serve the role of both system 112 and server 212, e.g., by utilizing a separate hard drive for backing up data.

Computer system 112 is depicted in FIG. 2 as executing system monitoring software 250. In one embodiment, system monitoring software 250 may perform three roles: to prepare data stored on computer system 112 for backup; to monitor computer system 112 for backup event triggers; and to backup the data stored on computer system 112 by sending it over network connection 202 to server 212. These three roles are described in further detail below, in conjunction with further exemplary embodiments of the present invention.

In some embodiments, computer system 112 is coupled to optional environmental monitor 251. In such embodiments, environmental monitor 251 is a detector, or series of detectors, that provide information to system 112 about the status of the environment around system 112. In one embodiment, environmental monitor 251 is a security system that monitors for unauthorized entry into the vicinity of system 112; e.g., a home break-in monitoring system. In another embodiment, environmental monitor 251 detects fire; e.g., a smoke alarm.

In some embodiments, computer system 112 is coupled to optional uninterruptible power supply (UPS) 252. In such embodiments, system 112 receives power from UPS 252 for a limited time, even after normal power is lost; e.g., the electrical line powering the office in which system 112 resides is cut. In one embodiment, UPS 252 is an external unit. In another embodiment, UPS 252 is incorporated into system 112. In one embodiment, system 112 is configured to detect when normal power is lost and UPS 252 is providing power.

In some embodiments, computer system 112 incorporates optional hardware monitor sensor 260 that may be used to detect events that potentially predict hardware failure. In several such embodiments, hardware monitor sensor 260 is positioned near data storage device 104. In one embodiment, hardware monitor sensor 260 includes a sound-sensitive component; e.g., a microphone. In another embodiment, hardware monitor sensor 260 includes a temperature-sensitive component; e.g., a thermocouple or thermal sensor. In one embodiment, hardware monitor sensor 260 is coupled to system 112, and the readings detected are available to system monitoring software 250, which may generate a backup event trigger based on the signals from sensor 260.

Server 212 is depicted in FIG. 2 as executing backup management software 290. In one embodiment, backup management software 290 has four roles: to monitor computer system 112; to trigger a backup of computer system 112 under certain circumstances; to retrievably store data transmitted from computer system 112; and to restore information to computer system 112 as needed. These roles are described in further detail below, in conjunction with further exemplary embodiments of the present invention. In some embodiments, backup management software 290 performs these roles remotely, e.g., by collecting and transferring information over network connection 202. In other embodiments, backup management software 290 executes, in part, on system 112, and performs these roles locally. In other embodiments, a combination of these two approaches is utilized.

Client Activity

System Monitoring Software

Figure 3:
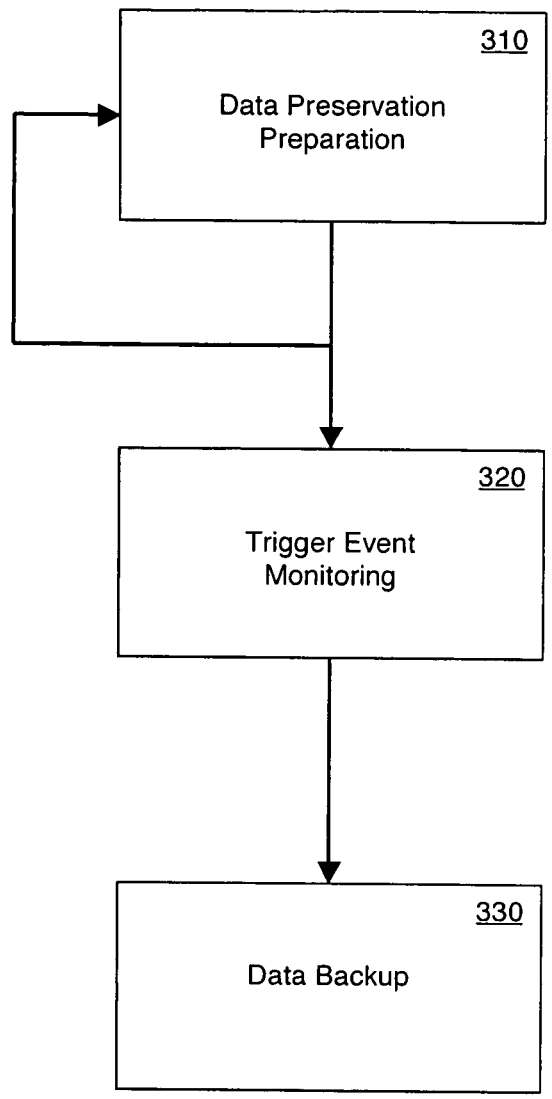
FIG. 3 is a flowchart of the operation of system monitoring software, in accordance with one embodiment of the present invention.

With reference now to FIG. 3, a flowchart 300 of the operation of system monitoring software 250 is depicted, in accordance with one embodiment of the present invention. In step 310, system monitoring software 250 performs data preservation preparations tasks. In step 320, system monitoring software 250 monitors the client system, system 112, for a backup event trigger. If a backup event trigger is detected, in step 330 system monitoring software 250 initiates the backup process.

Data Preservation Preparation

According to one embodiment of the present invention, in order for the backup of data from system 112 to server 212 to proceed quickly and efficiently, some pre-backup operations can be performed on the data in step 310. In the depicted embodiment, these data preservation preparation tasks are performed continually on system 112. In this embodiment, when new data is created or stored on system 112, system monitoring software 250 acts to prepare this data for backup, in order to expedite the backup process when the next backup event trigger is detected. In other embodiments, data preservation preparations tasks occur at a specified time, or under specified conditions, such as when system 112 has entered an idle state. In other embodiments, the data preservation preparations tasks are performed only immediately prior to transmitting the data over network connection 202. In several embodiments, a combination of these approaches is utilized. For example, in one embodiment high-priority data is subject to data preservation preparation immediately after it is stored on system 112, while less important data is prepared only after the system has been idle for a specified length of time.

A number of operations fall within the scope of data preservation preparation. In one embodiment, one such operation is compression of data. In another embodiment, data is encrypted. In another embodiment, data is assigned a priority level. In another embodiment, data is sorted on the hard disk, and arranged to speed access times during backup. In another embodiment, data is duplicated in a separate area of the hard drive, or onto another hard drive, to speed access times during backup. Other embodiments perform other data preservation preparation tasks or operations. A major consideration that influences what tasks are performed, and when the tasks should be performed, is the desire to reduce the time needed between a backup event trigger and transmission of data from system 112 to server 212. If essential tasks, such as the transmission order for the data, the compression of the data, and the encryption of the data stream are handled before a backup event trigger is detected, much less delay is required between such a detection and the start of data transmission.

Data Compression

In several embodiments, data compression is part of step 310. Data compression speeds the backup process by reducing the number of bytes that must be transferred over network connection 202. Also, in embodiments where data duplication is utilized, as discussed below, data compression reduces the amount of storage space used by system monitoring software 250 to stored the duplicated data. Depending on the type of compression routine selected, and the size and type of the data being compressed, data compression (and decompression) can require significant amounts of time and processor cycles. In embodiments where data compression is performed before a backup event trigger is detected, the amount of time between the detection of a backup event trigger and transmission of data from system 112 to server 212 is greatly reduced, as the data is already compressed and ready to be transferred.

In some embodiments, the type of data compression utilized is selected from the group of so-called "lossless" compression routines, which allow for data compression, and later decompression, without any loss of initial quality. Many such compression routines are known in the art, e.g., run-length encoding. In other embodiments, "lossy" compression routines are used, to allow for greater data compression than is possible with loss-less compression. Some embodiments utilize a combination of lossy and lossless compression routines. One such embodiment allows the user to select which types of data should be preserved without loss, and which can be backed up with some degradation in initial quality. In such an embodiment, crucial or mission critical data, e.g., data that cannot be modified, could be preserved using lossless compression techniques, while less important data is compressed using lossy techniques.

In some embodiments, compression of data occurs when data is entered into the system. One such embodiment is paired with data duplication, discussed below. This combination allows the user to have full access to his data stored on system 112, without having to decompress data every time it is accessed, while still allowing system monitoring software 250 to maintain a complete, compressed copy of the data ready for backup. In other embodiments, compression of data occurs at a preset time, or after a preset trigger occurs, e.g., at midnight every night, or after the system has been idle for 15 minutes. In other embodiments, only selected data is compressed when it enters system 112, while other data is left uncompressed to facilitate local access to it. One such embodiment compresses text documents immediately, as they can be decompressed quickly if needed, while not compressing multimedia files, which would take much longer to become accessible if needed.

In other embodiments, data is only compressed after a backup event trigger is detected. In another embodiment, whether compression is utilized or not is dependent upon the type of backup event trigger detected. In one embodiment, no data compression is performed.

Data Encryption

In some embodiments, data encryption is part of step 310. Data encryption makes the backup process more secure for users, by making the data being transferred much more difficult for unauthorized parties to access. In several embodiments, where server 212 and system 112 are owned and operated by different entities, including data encryption can ensure that data stored on server 212 remains secure, even though the owner of the data is not in control of server 212.

Many types of data encryption are known in the art, and can be practiced in conjunction with embodiments of the present invention. Several embodiments combine data compression and data encryption, such that system monitoring software 250 will both compress and encrypt the data at the same time. In some embodiments, data encryption occurs when the data enters system 112. One such embodiment is paired with data duplication, discussed below; in this embodiment, the duplicate copy of the data is encrypted when it is created, or shortly thereafter. In other embodiments, data encryption occurs at a specified time, or after a specified event; e.g., new data is encrypted at midnight every day, or after system 112 has been idle for fifteen minutes. In other embodiments, only selected data is encrypted when it enters system 112, while other data is left unencrypted to facilitate user access.

In other embodiments, data is encrypted after a backup event trigger is detected. In other embodiments, whether data is encrypted, and which type of encryption to use, is dependent upon the type of backup event trigger detected. For example, if the backup event trigger detected is imminent hard drive failure, a user might prefer to backup crucial data unencrypted, instead of spending time encrypting data and perhaps losing all of it. Other embodiments do not include data encryption as part of data preservation preparation.

Priority

In some embodiments, data stored in system 112 is assigned a priority level as part of step 310. Not all data stored in system 112 is of equal value. Most users would prefer to preserve certain types of data, even at the expense of other files. By using system monitoring software 250 to assign different levels of importance to different data, the user can determine which files are given preference in the backup process.

In some embodiments, a user assigns priority levels to files. In one embodiment, this assignment is conducted on a per-file basis, with the user selecting a priority level for each file. In another embodiment, the user determines a priority level for different types of files; in such an embodiment, a user could choose, for example, to give digital photographs priority over digital copies of movies. In another embodiment, the user specifies priority by location within system 112's file system; in this embodiment, the user could choose to have the directory where all of his email messages are stored to have a higher priority than the operating system's files. In another embodiment, the user can set rules for what priority is assigned to files, and system monitoring software 250 could establish priority levels based on those rules. In this embodiment, the user need not assign a priority to every file, but could, for example, configure system monitoring software 250 when it was installed to give priority to any file ending in .doc and .jpg over all other files. In other embodiments, a user may assign priority in different ways.

In other embodiments, system monitoring software 250 assigns priority to data. In one such embodiment, priority is assigned based on frequency of access, with user-generated files that are accessed more often getting higher levels of priority. In another embodiment, system monitoring software 250 is configured to identify user-generated content, such as word processing documents and digital photographs, and assign such files higher priority than operating system files. In another embodiment, higher priority is automatically assigned to smaller files, which can be backed up faster. In other embodiments, other approaches to assigning levels of importance to different files, types of files, or locations within the file system are implemented.

In some embodiments, both the user and system monitoring software 250 assign priority levels to data on system 112. In one such embodiment, system monitoring software 250 assigns a default level of priority to a given file, based on preconfigured rules such as those described above, and the user can choose to assign a different level of priority.

In some embodiments, multiple levels of priority are assigned to the same data. In one such embodiment, a user can assign priority based on how he wants his data preserved in situations where different backup event triggers are detected. For example, a user might assign a high priority to digital movie files for routine backups, but assign much lower priority levels to the same files in the event of an emergency backup triggered by imminent hardware failure. In this way, the user has greater flexibility in protecting his data.

In different embodiments of the present invention, the rules under which a priority system operates can vary significantly. For example, in some embodiments, a user may specify priority rules to take into account the relative change in a file, as well as how crucial the file is; e.g., a high-priority file that has changed only slightly since the last time it was backed up could be less important to the user than a lower-priority file that has never been backed up before, under the theory that slight revisions to an existing file would be easier to recreate, using the previous backup, than an entirely new file. Similarly, a user may assign one level of priority to a file in situations where a full backup is to be performed, and a different level of priority when an incremental backup will be performed. Embodiments of the present invention allow for many different priority rules to apply to data, to account for many different circumstances.

Priority, and the effect different priority levels have on the backup process, is discussed in further detail below, with reference to additional embodiments.

File Relocation

In some embodiments, system monitoring software 250 rearranges the data on data storage device 104 of system 112 as part of step 310. During the backup process, every file to be stored on server 212 must be located on data storage device 104. In embodiments where data storage device 104 is a mechanical storage system, e.g., a hard disk drive (HDD), the files to be backed up will often be spread across multiple platters in different locations. Transitioning between each file therefore takes time. One approach to reducing the time consumed by seeking for data is file relocation, wherein system monitoring software 250 rearranges data stored on data storage device 104 before a backup event trigger is detected. Embodiments incorporating this approach are explained with reference to FIGS. 4a and 4b.

Figure 4A:
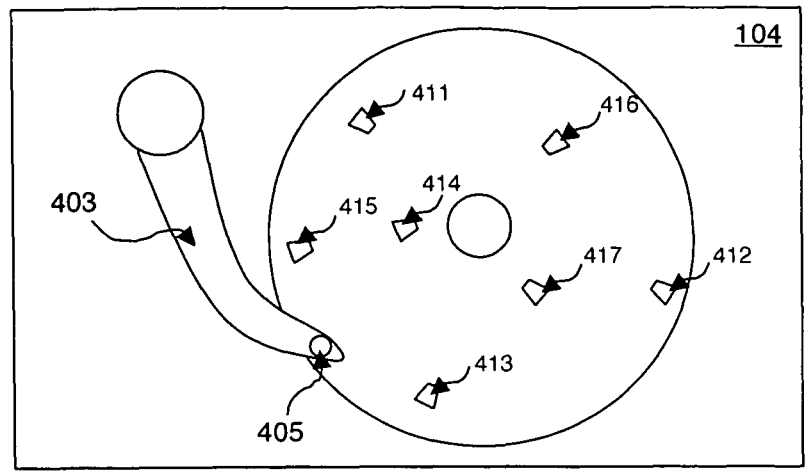
FIG. 4a is a representation of a hard disk drive, upon which embodiments of the present invention may be implemented.

With reference now to FIG. 4a, a representation of a top view of data storage device 104, a hard disk drive, is depicted. It is understood that embodiments of the present invention may be practiced in conjunction with many different types of data storage device 104, not only hard disk drives of the type here depicted. HDD 104 is shown as having a rotating platter 401, a moving arm 403, and a read head 405. Multiple files to be backed up are depicted on platter 401 as files 411, 412, 413, 414, 415, 416, and 417. In order to backup these files, arm 403 must move read head 405 to each of them in turn, a process known as seeking. Arm 403 must seek each file in turn, and will move at least seven times in order to reach each file. Seeking adds extra time to the backup process, and if the hard drive is failing, adds additional stress on the components that can result in the hard drive failing fully before all files are backed up.

Figure 4B:
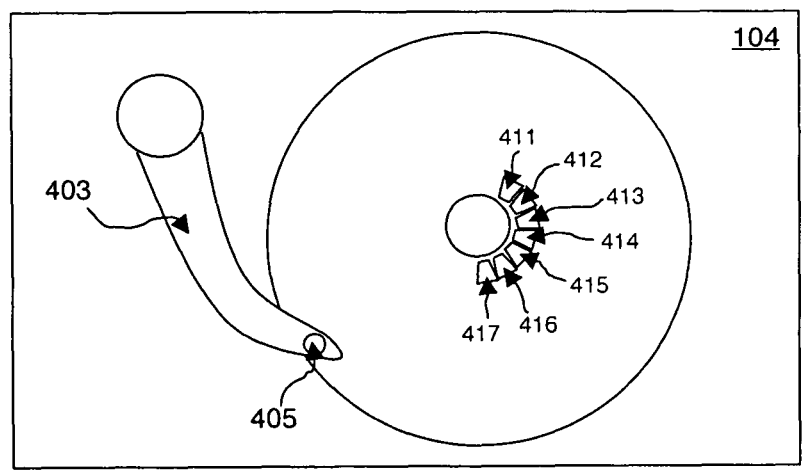
FIG. 4b is a representation of a hard disk drive, upon which embodiments of the present invention have been implemented.

With reference now to FIG. 4b, a representation of a top view of data storage device 104 is again depicted, in accordance with one embodiment of the present invention. In this embodiment, system monitoring software 250 has implemented file relocation during step 310 to arrange the files to be backed up on HDD 104, such that files 411, 412, 413, 414, 415, 416, and 417 are located near to each other on platter 401. If a backup event trigger is detected, and these files need to be backed up, arm 403 does not have to move as often or as far in order to reach all of the files to be backed up. This results both in a savings of time and a reduction of stress on the components of HDD 104.

In some embodiments that incorporate both a priority system and file relocation, the relocation of files takes into account the relative priority of data. For example, with reference to FIG. 4b, if files 411, 412, and 417 are all marked as being high priority files, while files 413 and 415 are medium priority, and files 414 and 416 are low priority, an embodiment utilizing both priority and file relocation would order the files to place higher priority data before lower priority data, e.g., files 411, 412, 417, 413, 425, 414, 416.

Other embodiments of the present invention do not incorporate file relocation.

Data Duplication

Some embodiments incorporate a data duplication scheme as part of step 310, in order to expedite the backup process. As noted above, data compression and encryption techniques are incorporated into embodiments of the present invention in order to provide a faster and more secure backup process. However, both compression and encryption of files will slow the speed at which system 112 may access that data. For example, in order for a user to open a digital movie file that has been compressed and encrypted by system monitoring software 250, the file must first be decrypted and decompressed. For larger files, this process may take several minutes. In embodiments that incorporate data duplication, the files to be backed up are duplicated, either in another location on data storage device 104 or on another data storage device available to system 112. As such, the files the user wants to access remain readily available, without compromising the advantages gained by the data preservation preparation process of step 310.

In one such embodiment, data is duplicated as soon as it enters system 112, or is modified. In other embodiments, data is duplicated at a specified time or after a specified trigger has occurred, such as at midnight every day or after system 112 has been idle for fifteen minutes. In other embodiments, certain specified types of data are duplicated immediately, while other types are duplicated at a specified time or after a specified trigger has occurred. In other embodiments, data duplication is paired with file relocation, to better order the duplicate files to be backed up on a hard disk drive.

In some embodiments, where both priority and data duplication are implemented, data duplication and subsequent storage takes into account the relative priority of data. For example, with reference to FIG. 4b, if files 411, 412, and 417 are all marked as being high priority files, while files 413 and 415 are medium priority, and files 414 and 416 are low priority, an embodiment utilizing both priority and data duplication would order the copied files to place higher priority data before lower priority data, e.g., copied files 411, 412, 417, 413, 425, 414, 416.

In other embodiments, only specified files are subject to data duplication. In other embodiments, data duplication is not utilized.

Monitoring for Backup Event Triggers

In several embodiments of the present invention, system monitoring software 250 performs step 320, monitoring client system 112 for backup event triggers. In one embodiment, backup event triggers are defined in system monitoring software 250 as conditions that, if met, trigger the backup process, defined below. The conditions that can constitute a backup event trigger vary in different embodiments. One consideration in enumerating the set of backup event triggers for a particular embodiment is under what conditions a user will find it valuable to have the data stored on system 112 automatically backed up. An exemplary list of backup event triggers appears below in Table 1. It is understood that this list is non-exhaustive; other embodiments incorporate other backup event triggers.

TABLE 1

| Time-Scheduled | System Idle |
| User-Initiated | New Data Preservation |
| Power Failure | Hard Disk Failure |
| Environmental | |

Time-Scheduled Backup

In some embodiments, system monitoring software 250 is configured to implement a time-scheduled backup scheme. In one embodiment, a time-scheduled backup scheme causes system monitoring software 250 to produce a backup event trigger at a preset time. In some embodiments, this time is user-configured; e.g., a user could set system monitoring software 250 to trigger at midnight every Monday night. In another embodiment, system monitoring software 250 selects a time to trigger a backup. In one such embodiment, system monitoring software 250 is configured to select a time when a user is unlikely to be using system 112, based on detected past usage. In other embodiments, a time-scheduled backup trigger occurs after a predetermined length of time since the last successful backup; e.g., system monitoring software 250 will schedule a backup to occur 72 hours after the last successful backup operation. One consideration in implementing a time-scheduled backup scheme is that the data on system 112 be routinely and regularly protected.

System Idle Backup

In some embodiments, system monitoring software 250 is configured to implement a system idle backup scheme. In such embodiments, system monitoring software 250 will produce a system idle backup trigger after a predetermined length of time has passed since the last activity in system 112. One such embodiment determines if system 112 is idle from HDD activity. Another embodiment determines system activity based on the presence of input from a keyboard, mouse, or other input device. One consideration in implementing a system idle backup scheme is that the backup activity of system monitoring software 250 not interfere with a user's access to system 112, while still providing regular protection for the data on system 112. In this case, backup processes may be inhibited during periods of detected user activity.

In one embodiment, system monitoring software 250 is configured to implement a system idle backup scheme and an incremental backup scheme, as described below. In this embodiment, for example, when system 112 enters an idle state, system monitoring software 250 produces a system idle backup trigger, and a backup process is initiated. When system 112 is no longer idle, e.g., a user accesses system 112, this backup process is suspended. When a second backup process is initiated, data already transmitted during the first, interrupted, backup process is not transmitted again.

User-Initiated Backup

In some embodiments, system monitoring software 250 is configured to implement a user-initiated backup scheme. In such embodiments, system monitoring software 250 allows a user to produce a user-initiated backup trigger, thereby starting the backup process. One consideration in implementing a user-initiated backup scheme is that the user will often know better than system monitoring software 250 when truly crucial data has been entered into system 112, and can therefore act to protect the data by starting a backup process. A further consideration is that the user will know better than system monitoring software 250 if system 112 is to be powered down or disconnected from network connection 202, and can start a backup process before this occurs.

New Data Preservation Backup

In some embodiments, system monitoring software 250 is configured to implement a new data preservation backup scheme. In such embodiments, system monitoring software 250 produces a new data preservation backup trigger after a predetermined amount of new data has been stored on system 112 since the last successful backup process. One embodiment of this type determines how much new data has been entered into system 112 during step 310, data preservation preparation. In one embodiment, the amount of new data is measured in terms of bytes. In another embodiment, the amount of new data is measured in terms of numbers of discrete files. In another embodiment, the amount of new data is measured with reference to the type of files that have been stored; e.g., a text document requires far fewer bytes than a digital movie file, but can be accorded equal importance. In some embodiments, the user configures system monitoring software 250 to set a threshold level for a new data preservation backup trigger. In other embodiments, system monitoring software 250 determines an appropriate threshold. One such embodiment determines a threshold value by tracking the normal generation of new data for a set time period; e.g., if system monitoring software 250 notes 150 new files being generated in system 112 every day, a reasonable threshold may be 300 new files, approximately two days productivity.

In some embodiments, the new data preservation backup scheme is implemented in conjunction with a priority system. In such embodiments, higher priority data is treated as more important than equal amounts of lower priority data. For example, system monitoring software 250 might produce a backup trigger after 10 megabytes of low-priority data have accumulated since the last successful backup of system 112, but might produce a backup trigger after only one megabyte of high-priority data has accumulated.

Power Failure Backup

In some embodiments, system monitoring software 250 is configured to implement a power failure backup scheme. In such embodiments, system 112 is configured to detect an imminent power failure. In one embodiment, system 112 is connected to uninterruptible power supply (UPS) 252, and UPS 252 and system 112 are configured such that system 112 can determine when normal power is lost, and generate a power failure backup trigger. In another embodiment, system 112 is powered by an expendable energy source, and configured to detect when that energy source is running out; e.g., a laptop computer running on battery power. One consideration is that data be protected in the event of a loss of power to system 112, through detection of imminent power failure.

Hard Disk Failure

In some embodiments, system monitoring software 250 is configured to implement a hard disk failure backup scheme. In such embodiments, system monitoring software 250 is configured to produce hard disk failure backup triggers. In some embodiments, system monitoring software 250 tracks factors that affect HDD performance and expected life, and that may potentially predict a system failure. In such embodiments, as a HDD is exposed to more factors that are expected to reduce its operational life, system monitoring software 250 increases the frequency of backup triggers, so as to reduce the risk of loss of data from hard disk failure.

One factor affecting the expected life of the HDD is the age of the HDD. System monitoring software 250, in one embodiment, determines the approximate age of the HDD. Exemplary methods of determining the age of a HDD include checking the system registry in the operating system of system 112 to determine when the HDD was installed in system 112, or referencing the HDD's model number or serial number against a list of known manufacturing periods. In another embodiment, system monitoring software 250 considers the number of read/write cycles the hard drive has performed, which effects the life expectancy of a hard drive. In another embodiment, system monitoring software 250 considers the number of on/off cycles the hard drive has undergone, which effects the life expectancy of a hard drive. Further embodiments combine some or all of these approaches, in considering how frequently to generate backup triggers.

Another factor affecting HDD life is environmental factors such as temperature. HDDs that operate under consistently extreme temperatures have a shorter operational life than HDDs that operate only in controlled environments. Similarly, HDDs that are operated in systems with no cooling fan, or in systems where the cooling fan has failed, have a shorter operational life than HDDs operated in cooled systems. In one embodiment, system 112 incorporates hardware monitor sensor 260, a system temperature monitor. System monitoring software 250 is configured to record system temperatures, and compare average operating temperatures against compiled statistics of average system temperature and expected HDD life.

A related factor affecting HDD life is the temperature gradient to which the HDD is exposed. Even more than operating at extreme temperatures, exposure of a HDD to large, sudden changes in temperature can significantly reduce expected HDD life. In one embodiment, system 112 incorporates hardware monitor sensor 260, a system temperature monitor. System monitoring software 250 is configured to record system temperatures, determine temperature gradients, and compare against compiled statistics of temperature gradients and expected HDD life.

Other factors affecting the expected life of the HDD are known in the art. In other embodiments, system monitoring software 250 and system 112 are configured to allow system monitoring software 250 to be aware of these factors, and adjust the frequency of backup triggers accordingly.

In some embodiments, system monitoring software 250 and system 112 are configured to allow for detection of factors that may potentially predict imminent HDD failure. In several such embodiments, a combination of hardware incorporated in system 112 and instructions incorporated in system monitoring software 250 allow for recognition of HDD failure symptoms.

One such symptom is a change in the sounds produced by operation of the HDD. For example, some HDDs become louder and can produce a clicking sound immediately before catastrophic HDD failure. Several embodiments incorporate a microphone into system 112, positioned near to HDD 104, to measure the sounds produced during HDD operation, e.g., the pitch and amplitude of the sounds. Other embodiments incorporate a sound detecting sensor into HDD 104 itself, to accomplish a similar purpose. By comparing the sounds produced against an expected acoustic profile, system monitoring software 250 can predict imminent HDD malfunction of failure, and produce a backup trigger. In some embodiments, system monitoring software 250 compares the current sounds against an acoustic profile generated from past performance of this same HDD 104. In other embodiments, system monitoring software 250 is configured to use a pre-established acoustic profile compiled by a manufacturer of a particular HDD.

Another symptom of imminent HDD failure is a sudden increase in operating temperature of the HDD. Some embodiments incorporate a temperature sensor into system 12, positioned near to HDD 104, to measure the operating temperature. Other embodiments incorporate a temperature sensor into HDD 104 itself, to accomplish a similar purpose. By detecting a sudden increase in operating temperature, system monitoring software 250 can potentially predict imminent HDD malfunction or failure, and produce a backup trigger.

Environmental Backup Triggers

In some embodiments, system monitoring software 250 is configured to implement an environmental backup scheme. In such embodiments, system monitoring software 250 is configured to produce an environmental backup trigger if a prescribed environmental condition occurs. In some embodiments, system 112 is coupled to environmental monitor 251, which provides information about the environment system 112 resides in. In one embodiment, system 112 is an office workstation, and environmental monitor 251 is a security system monitoring the office for break-ins. If a break-in occurs, environmental monitor 251 detects it, system 112 is informed, and system monitoring software 250 can produce a backup trigger to begin a backup process, which may allow data to be backed up before system 112 is stolen, vandalized, or otherwise disconnected from server 212. In another embodiment, environmental monitor 251 is a fire detection system, allowing system monitoring software 250 to initiate a backup process when a fire is detected, and preserving data in the event system 112 is damaged or destroyed. In other embodiments, other environmental monitors 251 are used to detect other conditions local to system 112 that should prompt a backup trigger. In some embodiments which implement both environmental backup triggers and weighted backup triggers, some or all environmental backup triggers are weighted so as to prompt an immediate backup process.

Weighted Backup Triggers

In some embodiments, backup event triggers are given different weighting, or levels of importance. Such embodiments often implement a backup urgency scheme, discussed in greater detail below. In such an embodiment, a backup event trigger such as a time-scheduled backup would receive less weight than would an imminent hardware failure. Other embodiments allow for these weightings to change over time. In one such embodiment, for example, a time-scheduled backup would receive progressively greater levels of importance, the longer it has been delayed.

Backup Process

In some embodiments, system monitoring software 250 is configured to perform step 330, a backup process, after a backup event trigger has been detected. In other embodiments, system monitoring software 250 causes a separate backup process to execute. In some embodiments, backup process 330 involves transmitting data stored on system 112 over network connection 202 to server 212. Some embodiments include a backup urgency test as part of step 330. Some embodiments utilize a priority scheme to determine which data to send first. Some embodiments utilize an incremental backup scheme in sending data.

Backup Urgency Test

In some embodiments, after a backup event trigger is detected, a backup urgency test is performed. In such embodiments, the need for an immediate backup is weighed against other concerns; if the need for a backup is greater, backup begins immediately, and if it is not, the backup process is delayed. Exemplary factors influencing each side of this balancing heuristic are described below; other embodiments of system monitoring software 250 incorporate other factors into the backup urgency test.

In some embodiments, the need for a backup is affected by the type of backup event trigger detected. In one embodiment, if potential imminent hard drive malfunction or failure is detected, the need for a backup is given the highest level of urgency. In another embodiment, a time-scheduled backup is given a much lower level of urgency. One consideration in establishing levels of urgency for different backup event triggers is how likely the data on system 112 is to be lost, if a backup process is not initiated immediately.

In some embodiments, the need for a backup is affected by the length of the time since the last successful backup. In one such embodiment, where a time-scheduled backup has been delayed multiple times, each successive backup urgency test will give greater urgency to the need for a backup, until a backup is accomplished.

In some embodiments, where a priority system has been implemented for data, the need for a backup is affected by the priority of data that has accumulated on system 112 since the last successful backup. In one such embodiment, for example, greater need for backup is assigned by system monitoring software 250 when, for instance, 10 megabytes of high-priority data has accumulated than when 10 megabytes of low-priority data has accumulated.

In some embodiments, the need for a backup is measured against the current level of activity in system 112. In several such embodiments, consideration is given to how the user is accessing system 112, and system monitoring software 250 balances the need for a backup against the user's desire to access system 112. One consideration is that a backup process often requires intensive access to system resources, such as HDD and network connection access; initiating a backup while a user is performing some task that involves extensive HDD or network access is inconvenient for the user, and not an efficient use of system 112.

One embodiment monitors HDD activity on system 112 to determine system 112's activity level. Another embodiment monitors network connection activity, to determine when network connection 202 is available to transmit data to server 212. Another embodiment monitors use of input devices, e.g., mouse and keyboard, to determine when system 112 is in an idle state. Another embodiment links system monitoring software 250 to a screensaver program executing on system 112, such that a backup process would not start unless the system were idle long enough for the screensaver program to execute. Other embodiments incorporate other methods for determining system or network activity levels.

In other embodiments, where a backup urgency test is not implemented, system monitoring software 250 monitors system 112 activity, and avoids executing a backup process whenever system 112 is being used.

Data Integrity

Some embodiments incorporate various methods to allow for checking the integrity of the data after it is received. Many methods known in the art are appropriate for ensuring data accuracy, including, but not limited to, generating a checksum prior to transferring the data to server 212, transmitting the checksum information, and having server 212 verify the integrity of the data sent. Other embodiments incorporate other systems of checking data integrity.

Data Encryption

In some embodiments, before data is transferred over network connection 202, a secure, encrypted connection must be established between system 112 and server 212. Many forms of encrypted connection are known in the art and are suitable for practicing embodiments of the present invention, including, but not limited to, secure socket layer (SSL) or secure shell (SSH). In other embodiments, a secure connection is not required before transmitting data. One such embodiment incorporates encryption of data during step 310, which would reduce the risk of data being accessed by unauthorized personnel.

Data Transfer

Different embodiments of the present invention utilize different methods of data transferal. Any method of reliably transmitting data from system 112 to server 212 over network connection 202 is acceptable in practicing embodiments of the present invention. One embodiment utilizes the Internet as a transfer medium, and formats the data in accordance with the Internet protocol (IP). Other embodiments utilize different types of network connection 202, and encode the data in accordance with other data transfer protocols.

In some embodiments, system monitoring software 250 implements incremental storage of data. In such an embodiment, system monitoring software 250 only transfers data that was added since the last time system 112 was backed up. Identification of new data, in one embodiment, is accomplished as part of step 310. In another embodiment, new data is identified immediately before transmittal, as part of step 330. One consideration in deciding whether to implement incremental backup is whether the speed at which a full backup is completed is more important than maintaining complete, separate backed up records of the data on system 112. Other embodiments omit incremental storage, instead transmitting all data to be backed up every time a backup process is executed. A full backup of this sort is useful for systems with rapidly changing data, for archival purposes, and for systems that may be subject to attack by malicious programs or viruses. Some embodiments incorporate a combination of these two approaches. In one such embodiment, for example, a full backup is performed once every month, with incremental backups performed weekly.

In some embodiments, a backup process executes until it is complete. In such embodiments, once data transfer has begun, it continues until all data from system 112 is transmitted to server 212. In other embodiments, the backup process is suspended whenever the user accesses system 112 for another purpose. In such an embodiment, the user's use of system 112 is not significantly impaired by the execution of the backup process. In other embodiments, whether the backup process can be suspended is subject to the same criteria as the backup urgency test, described above. In one such embodiment, for example, if enough high-priority data had accumulated to force a backup to occur at an inconvenient time, the backup process will not be suspended until enough high-priority data is transferred to alter the outcome of the urgency test. In another set of embodiments, the backup process may continue while a user accesses system 112, but at a reduced rate. For example, the transfer of data over network connection 202 may be limited to a fixed percentage of available network bandwidth, processor bandwidth, and/or drive bandwidth, while the user is accessing system 112, to allow the user some use of system 112 while not fully suspending the backup process.

Server Activity

Backup Management Software

Figure 5:
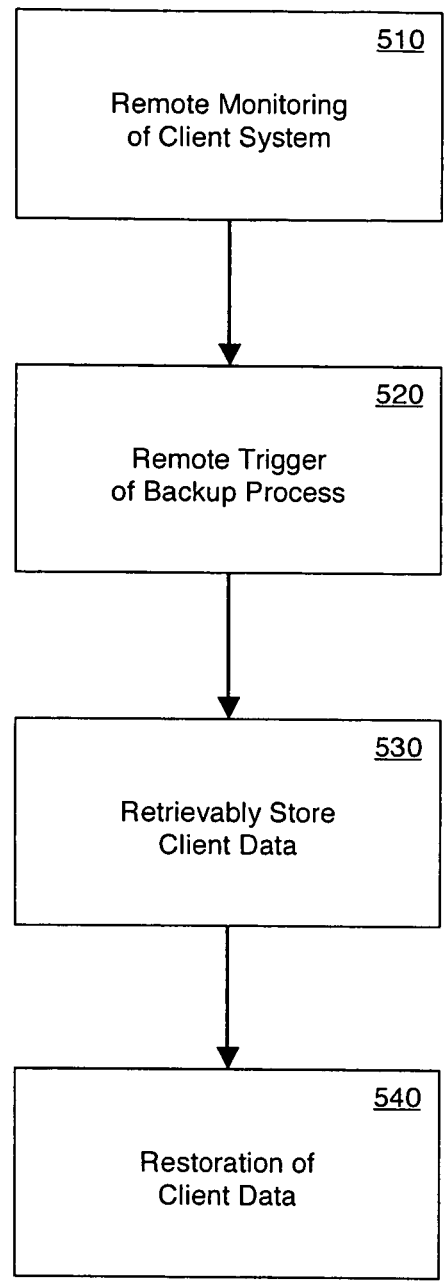
FIG. 5 is a flowchart of the operation of backup management software, in accordance with one embodiment of the present invention.

With reference now to FIG. 5, a flowchart 500 of the operation of backup management software 290 is depicted, in accordance with one embodiment of the present invention. In step 510, backup management software 290 remotely monitors the operation of client system 112. In step 520, backup management software 290 remotely triggers a backup process on client system 112. In step 530, if backup management software 290 has remotely triggered a backup process, or if system monitoring software 250 initiated a backup process, backup management software 290 retrievably stores the data received from client system 112. In step 540, backup management software 290 acts to restore the stored data to the client.

Remote Monitoring

In some embodiments, backup management software 290 is configured to perform remote monitoring of system 112. In some embodiments, remote monitoring allows server 212 to act as a failsafe for system monitoring software 250 by providing some duplication of essential tasks remotely. In several embodiments, backup management software 290 also monitors system 112 for problems that would be more difficult to detect client-side.

Client Backup Event Triggers

In some embodiments, backup management software 290 duplicates the monitoring for backup event triggers that occurs in system monitoring software 250, described above. In several such embodiments, the monitoring information available to system monitoring software 250 is transmitted over network connection 202 to backup management software 290, and the same evaluation of present conditions occurs on system 112 and server 212.

In other embodiments, only selected information is transferred to server 212, and backup management software 290 monitors system 112 for select backup event triggers. In one such embodiment, for example, where system monitoring software 250 incorporates hard drive failure detection, samples of present hard drive sounds are transferred to server 212, and backup management software 290 monitors the sounds for evidence of impending failure. One consideration in determining which monitoring tasks to duplicate in backup management software 290 is whether backup management software 290 could perform the monitoring role better than system monitoring software 250 will. For example, in the embodiment described above, an off-site server 212, maintained by a company providing backup services to multiple clients, is more likely to include up-to-date versions of backup management software 290, including acoustic profiles of all available HDDs.

Other embodiments of backup management software 290 do not duplicate any of the monitoring tasks of system monitoring software 250.

Other Monitoring Tasks

In some embodiments, backup management software 290 monitors system 112 and system monitoring software 250 for other problems or issues that should result in a backup process. In one embodiment, backup management software 290 monitors system 112 for corruption or software degradation. Such irregular system performance can be caused by viruses, malicious programs, or file system corruption. For example, if backup management software 290 contacts system monitoring software 250 with a request for a status update and receives a nonsensical or unexpected response, system 112 may have problems that threaten the data stored thereon, and should be backed up immediately.

In another embodiment, backup management software 290 is configured to determine how much time has elapsed since the last successful backup process. One embodiment allows backup management software 290 to be configured to initiate a backup process after a predetermined length of time has elapsed. Another embodiment allows backup management software 290 to be configured to attempt to contact an individual responsible for system 112, e.g., via an electronic mail message, and notify them that system 112 has not been backed up recently.

In another embodiment, backup management software 290 is configured to initiate a remote backup if system 112 is known to be in a threatened location. In one embodiment, for example, server 212 is connected to multiple systems 112 in a single city; if that city is known to be at risk from a major fire, an earthquake, a tornado, a hurricane, or other similar disaster, backup management software 290 can initiate a remote backup process on all systems 112 in the threatened location.

In another embodiment, backup management software 290 is configured to initiate a remote backup when a substantial virus or system security threat is detected. In some embodiments, backup management software 290 is notified of a new virus spreading through the Internet, e.g., a self-replicating email worm, and initiates a remote backup of all systems 112 monitored by backup management software 290, in order to minimize damage caused if one or more systems 112 becomes infected.

Other embodiments incorporate other remote monitoring tasks.

Remote Backup Process

In some embodiments, backup management software 290 is configured to initiate a remote backup process. Backup management software 290, in these embodiments, initiates a remote backup process in response to a backup event trigger, such as those detailed above, or in response to one of the other monitoring tasks, described above.

In several such embodiments, backup management software 290 can signal system monitoring software 250 to initiate a backup process. In one embodiment, a remote backup trigger is subject to the urgency balance test detailed above. In another embodiment, a remote backup trigger is acted on immediately.

Retrievably Store Data

In some embodiments, backup management software 290 is responsible for retrievably storing the data received from system 112. In other embodiments, backup management software 290 calls other programs which retrievably store data. In many embodiments, extra safeguards are in place to ensure the safety of the data stored on server 212. In several embodiments, for example, a redundant array of independent disks (RAID) configuration is utilized, to better ensure data preservation on server 212. Other embodiments use other methods of data storage known in the art for securely storing data.

In some embodiments, backup management software 290 encrypts the data to be stored. As discussed previously, many types of encryption are available for use with embodiments of the present invention.

In some embodiments, backup management software 290 allows outside access to the data stored on server 212. One such embodiment allows a user to access his data stored on server 212 over the Internet. In this embodiment, a user has the ability to access and display his data without needing to expose system 112 to outside access, which allows for better security on system 112.

In some embodiments, backup management software 290 overwrites old data from system 112 whenever a backup process is implemented. In such an embodiment, the amount of storage space required to store data from system 112 can be more readily controlled. In other embodiments, backup management software 290 stores data received from system 112 in a new location each time a backup process is implemented. While consuming much greater space, these embodiments allow for better archival of data, as well as better restoration of data, should system 112 be infected by malicious programs or viruses. In such a case, the most recent backup of system 112 may be infected as well, while an earlier version of the data from system 112 may be clean. Some embodiments mix these two approaches, allowing for several backup sessions from system 112 to coexist on server 212 at one time. This allows for a balance between storage requirements and archival or restoration uses.

Restore Data

In some embodiments, backup management software 290 allows for the restoration of data to system 112. In several such embodiments, backup management software 290 transfers the data stored on server 212 over network connection 202, back to system 112. In some embodiments, the owner or operator of server 212 may charge a fee for the restoration of data. Transferring data and restoring it to system 112 is accomplished in many different ways in different embodiments. Any approach known for transferring and restoring data across a network connection will suffice to practice embodiments of the present invention.

Special Case

"Loaded Gun" Backup Process

As discussed previously, one common failing of prior art backup systems is that they are inherently slow to begin the actual backup process. Such systems are not prepared to initiate a backup process under emergency situations, where the amount of time available to backup the system is both limited and unknown. Several embodiments of the present invention are directed towards methods and systems for providing data backup services in emergency situations. In some embodiments, the backup process is continually ready to execute, allowing data transfer to begin immediately after an emergency backup event trigger is detected.

Figure 6:
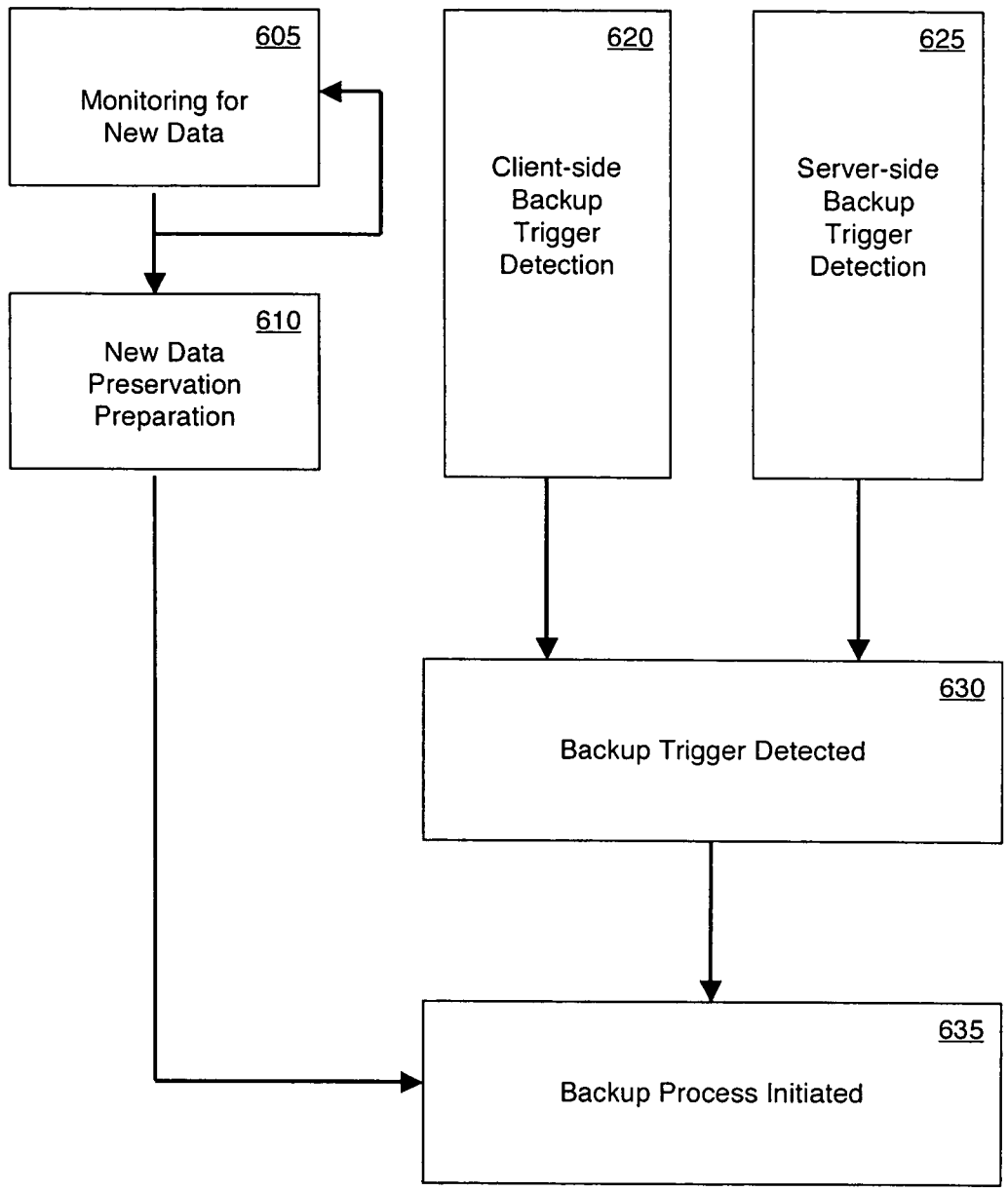
FIG. 6 is a flowchart of a backup process, in accordance with one embodiment of the present invention.

With reference now to FIG. 6, a computer controlled flowchart depicting a backup process is shown, in accordance with one embodiment of the present invention. With reference to FIGS. 2 and 6, embodiments configured to provide data backup services in emergency situations will be detailed.

With reference now to step 605, in some embodiments system monitoring software 250 monitors system 112 for new or altered data. Upon initial execution of system monitoring software 250, all data in system 112 would register as new. After the first successful backup process, only data that was subsequently added to system 112, or data that was changed since the last successful backup process, would be identified as new. In some embodiments, system monitoring software 250 can be configured to ignore certain files, types of files, or locations within the file structure of system 112. In these embodiments, the user can elect not to backup certain less important files, e.g., operating system files, temporary storage files, or easily reinstalled programs, in favor of preserving more important data. In other embodiments, only new data of a certain type, or in a defined location within the file structure of system 112, will be registered as new. In some embodiments, the degree of change in an existing file is also identified, which can allow a user to specify differing levels of importance for slightly altered files, heavily altered files, and completely new data. These embodiments allow the user further control over what data is preserved, by excluding data by default and allowing the user to select which types of files, or which directories, to backup.

With reference now to step 610, in some embodiments system monitoring software 250 prepares the new data for preservation. In these embodiments, one consideration is that the data be identified to system monitoring software 250 in such a way that, in the case of an emergency backup event trigger, no searching is required to locate the data before transmission. In one embodiment, this is accomplished by system monitoring software 250 creating or updating a list that identifies the location of all new data in system 112, e.g., a database that stores the addresses of all new data files. In another embodiment, a file relocation scheme, such as that detailed above with reference to FIG. 2, is utilized. In another embodiment, a data duplication scheme, such as that detailed above with reference to FIG. 2, is utilized. In all of these exemplary embodiments, system monitoring software 250 has identified the location of all new data in system 112 before an emergency situation occurs, and no time is lost by needing to search for the new data.

In some embodiments, step 610 also encompasses data compression. A consideration in these embodiments is speed of transmission, as less time is required to transmit compressed data over network connection 202 to server 212. In an emergency situation, faster transmission of data can mean that more data is backed up before transmission is terminated.

In some embodiments, step 610 also encompasses data encryption. A consideration in these embodiments is whether security, both during transmission and after data is stored on server 212, is a concern. If server 212 and network connection 202 are both trusted, encryption is less important than if server 212 is off-site, and network connection 202 is an Internet connection.

In some embodiments, step 610 also encompasses data priority flagging. In these embodiments, as discussed above, the relative importance of data can be established. In an emergency situation, higher priority data can be transmitted before lower priority data, better ensuring the preservation of high priority data even if the transmission is terminated before the backup process is completed.

With reference now to step 620, in some embodiments system monitoring software 250 monitors system 112 for emergency situations. In other embodiments, system monitoring software 250 monitors the environment of system 112 for emergency situations. Other embodiments combine these features, while others also configure system monitoring software 250 for monitoring system 112 for other backup event triggers as well. One consideration in selecting what events to monitor for is whether a particular situation has the potential to interrupt the backup process. A number of such situations are detailed above, including power interruption, hard drive failure, and environmental situations, such as fire or security system alerts.

With reference now to step 625, in some embodiments backup management software 290 monitors system 112 for emergency situations. In other embodiments, backup management software 290 monitors the environment of system 112 for emergency situations. Other embodiments combine these features, while other also configure backup management software 290 to monitor system 112 for other backup event triggers as well. Again, one consideration in selecting events to monitor for is how likely a particular event is to prevent a successful backup process. A number of such situations are described above, including those detailed for step 620, as well as monitoring for other environmental factors, such as a fire or natural disaster occurring near system 112.

With reference now to step 630, an emergency backup event trigger is detected.

With reference now to step 640, in some embodiments, system monitoring software 250 starts a backup process. In other embodiments, backup management software 290 initiates a backup process, by sending a command or series of commands to system 112 over network connection 202. In some embodiments, network connection 202 must be established before data transmission can begin. In other embodiments, network connection 202 is already established. Data begins transmitting from system 112 to server 212 over network connection 202. In embodiments, where a priority data system has been implemented, higher priority data is transmitted before lower priority data. In other embodiments, smaller files are transmitted before larger files. One consideration that applies to all embodiments is that data transmission begin as soon as possible, so as to allow the largest amount of data possible to be transmitted to server 212 before transmission is terminated.

Embodiments of the present invention are thus described. While the present invention has been described in particular embodiments, it should be appreciated that the present invention should not be construed as limited by such embodiments, but rather construed according to the following claims.

What is claimed is:

1. A method of generating backup data, said method comprising:
   identifying data located in a computer to be backed up;
   identifying a backup event trigger, wherein said backup event trigger is associated with a level of importance based on an importance of an event, and wherein said level of importance is operable to be modified;
   monitoring said computer for an occurrence of said backup event trigger;
   via a communication network, sharing information resulted from said monitoring and current activities of said computer with a backup manager that resides in a remote server device, wherein said backup manager, in response to said occurrence of said backup event trigger, is operable to:
   apply a balancing heuristic to determine whether to initiate a backup process based on said information and said current activities, wherein said balancing heuristic comprises determining if a current activity on said computer is of higher importance than said level of importance of said backup event trigger; and if said level of importance of said backup event trigger is of higher importance than said current activity on said computer, send an instruction via said communication network to said computer to initiate said backup process;

sending said data to a storage device for backup in response to said instruction; and if said current activity on said computer is of higher importance, delaying said backup process and increasing said level of importance of said backup event trigger.

2. The method of claim 1, wherein said storage device comprises a redundant array of independent disks (RAID) communicably coupled to said computer and said remote server device.

3. The method of claim 1, further comprising:
detecting if said computer switches between an active and an idle state;
in response to said computer switching to an idle state, initiating an incremental backup process; and
in response to said computer switching to an active state, suspending said incremental backup process.

4. The method of claim 1, further comprising:
compressing and encrypting said data before said sending said data to said storage device.

5. The method of claim 1, wherein said event is selected from a group consisting of corruption of said computer, degradation of said computer, acoustic irregularity on a hard disk drive (HDD) of said computer, detection of an environmental hazard that is potentially detrimental to said computer, detection of a virus on said computer, and detection of a security breach on said computer.

6. The method of claim 1, wherein said backup manager is further operable to send periodic instructions to said computer to initiate periodic backup processes.

7. The method of claim 1, wherein said storage device resides in said remote server device, and wherein said backup manager is further operable to retrievably store said data sent from said computer.

8. The method of claim 1 further comprising:
assigning a level of importance to said data.

9. The method of claim 1, wherein said backup manager is further operable to restore backup data from said storage device to said computer.

10. The method of claim 1, wherein said backup manager is further operable to compare said level of importance of said backup event trigger to a level of importance of said current activity prior to sending said instruction.

11. A method of backing up a computer, said method comprising:
identifying data to be preserved within said computer, wherein said identifying is accomplished before a backup process is initiated;
at said computer, detecting a trigger event, wherein said trigger event has a level of importance indicating importance of said trigger event, and wherein said level of importance is operable to be modified;
sending information related to said detecting said trigger event to a remote device communicably coupled to said computer, wherein said remote device comprises a backup manager configured to:
in response to said detecting said trigger event, apply a balancing heuristic to determine whether to initiate said backup process, wherein said balancing heuristic comprises determining if a current activity on said computer is of higher importance than said level of importance of said trigger event; and
send an instruction to said computer for initiating said backup process if said current activity on said computer is of lower importance than said level of importance of said trigger event, wherein said backup manager is further operable to send periodic instructions to said computer to initiate periodic backup processes;
performing said backup process based on said instruction; and
encrypting and compressing said data within said computer, wherein said compressing and encrypting is accomplished before said backup process is initiated.

12. The method of claim 11, further comprising:
duplicating said data within said computer, wherein said duplicating is accomplished before said backup process is initiated.

13. The method of claim 11, further comprising:
assigning a priority level to said data.

14. The method of claim 13, further comprising:
backing up said data with reference to said priority level.

15. The method of claim 11, further comprising:
assigning a plurality priority levels to said data.

16. The method of claim 11, wherein said detecting said trigger event further comprises:
monitoring a security system, said security system for detecting intrusion into the environment of said computer.

17. A method of remotely initiating a backup process over a network connection between a client computer and a server, said method comprising:
executing client software on said client computer, said client software configured to determine status information about said client computer, said client software also configured to initiate a backup process, wherein said status information comprises a backup event trigger associated with a level of importance of an event, and wherein said level of importance associated with said backup even trigger is operable to be modified;
transmitting said status information over said network connection to said server that comprises backup manage software; and
in response to said transmitting said status information, receiving an instruction at said client computer from said server over said network connection, wherein said instruction is generated by said server executing said backup management software based on said status information, and wherein further said instruction is operable to cause said client software to initiate said backup process when a current activity on said client computer is of lower importance them said level of importance of said backup trigger event, and wherein said backup manager is further operable to send periodic instructions to said computer to initiate periodic backup processes.

18. The method of claim 17, wherein said status information comprises information about the activity level of said client computer.

19. The method of claim 17, wherein said status information comprises information about data shared on said client computer.

20. The method of claim 17, wherein said status information comprises information about the status of the hardware of said client computer.

* * * * *